US006886822B2

United States Patent
Kawakami

(10) Patent No.: US 6,886,822 B2
(45) Date of Patent: May 3, 2005

(54) WORK SUPPORT

(75) Inventor: Takayuki Kawakami, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 28 days.

(21) Appl. No.: 10/471,169

(22) PCT Filed: Feb. 15, 2002

(86) PCT No.: PCT/JP02/01328
§ 371 (c)(1), (2), (4) Date: Sep. 5, 2003

(87) PCT Pub. No.: WO02/076673
PCT Pub. Date: Oct. 3, 2002

(65) Prior Publication Data
US 2004/0130086 A1 Jul. 8, 2004

(30) Foreign Application Priority Data
Mar. 22, 2001 (JP) .................................. 2001-082546

(51) Int. Cl.⁷ ................................................ B23Q 3/00
(52) U.S. Cl. .......................... 269/309; 269/24; 269/32; 269/310; 279/2.1; 279/2.06
(58) Field of Search ............................. 269/309–310, 269/32, 24, 91–95; 279/2.1, 2.06, 4.01, 2.9; 188/67, 265; 60/593, 583

(56) References Cited

U.S. PATENT DOCUMENTS 5,957,443 A    9/1999   Mascola
6,598,713 B1 * 7/2003  Kawakami ................... 188/67
6,691,994 B2 * 2/2004  Kawakami ................. 269/309
2004/0130086 A1 * 7/2004  Kawakami ................. 269/309
2004/0188908 A1 * 9/2004  Kitaura ...................... 269/309

FOREIGN PATENT DOCUMENTS

JP    S62-213934    9/1987
JP    2002-31105    1/2002

OTHER PUBLICATIONS

Patent Abstracts of Japan for JP2002–31105 published on Jan. 31, 2002.
Patent Abstracts of Japan for JP62–213934 published on Sep. 19, 1987.

* cited by examiner

Primary Examiner—Lee D. Wilson
(74) Attorney, Agent, or Firm—Darby & Darby

(57) ABSTRACT

The abutment of the rod to the work piece is accomplished in a stable manner by providing an air passage in the inside of the work support for supplying pressurized air for detecting the abutment between the rod and the work piece. Work support is equipped with case, rod, sleeve that elastically deforms to reduce its diameter, hydraulic cylinder for driving rod in an advancing direction, spring for elastically energizing rod in advancing direction, detection nozzle for ejecting pressurized air, air passage connected to detection nozzle, sensor for detecting abutment between the tip of rod and work piece based on air pressure, and a control unit. Work piece is supported by the tip of rod abutting work piece while ejecting pressurized air from detection nozzle, and locks rod by elastically deforming sleeve to reduce its diameter after detecting the abutment of rod by a pressure sensor and control unit.

9 Claims, 3 Drawing Sheets though the rod is locked after the rod's abutment against the work piece is confirmed according to the air pressure increase. The resistance can increase and the weight balance of the rod can deteriorate if the hose is surrounded by chips and debris from machining, so that the rod's advancing motion can become unstable.

WORK SUPPORT

CROSS REFERENCE TO PRIOR APPLICATION

This is a U.S. national phase application under 35 U.S.C. §371 of International Patent Application No. PCT/JP02/01328, filed Feb. 15, 2002, and claims the benefit of Japanese Patent Application No. 2001-82546 filed Mar. 22, 2001. The International Application was published in Japanese on Oct. 3, 2002 as WO 02/076673 A1, under PCT Article 21(2).

BACKGROUND OF THE INVENTION

1. Field of the Invention

The invention relates to a work support wherein a rod is locked by elastically deforming a sleeve so as to reduce its diameter by means of hydraulic pressure, more specifically, to a work support which makes it possible to lock the rod after the rod is securely abutted against the work.

2. Description of the Related Art

Work supports of various structures have been practically used to support the work piece both from the machining side and the other side in order to prevent deterioration of machining accuracy due to elastic deformation or chattering of the work piece in fastening the work piece on a work pallet, etc. The applicant has invented such a work support which uses a rod that can be securely locked by hydraulic pressure.

The work support has a rod, a sleeve that fits on the outside of the rod and is elastically deformable to reduce its diameter, a case that supports the sleeve, and an outer peripheral hydraulic chamber formed on the outer periphery of the sleeve, as well as a hydraulic cylinder that moves the rod back and forth in coordination with a spring.

In order to support a work piece using this work support, the work piece is set by placing it on one or more of work supports, and clamped on its outer periphery with another fixture and a clamping device. Next, pressurized oil is supplied to the hydraulic cylinder from a hydraulic supply source to move a piston member upward, which causes the rod to also move upward and the motion of the piston member is assisted by the force of a spring, allowing the tip of the rod to abut against the work piece lightly. In the mean time, pressurized oil is supplied from the oil chamber of the hydraulic cylinder through an oil channel to the outer peripheral oil chamber, which causes the sleeve to elastically deform reducing its diameter to solidly lock the rod, hence causing the rod to support the work piece in order to prevent the work piece from being elastically deformed or chatter during machining.

In the work support, the pressure of the oil in the oil chamber is kept low so that the rod does not get locked while the rod is advancing and that the rod is to be locked only after the rod has abutted against the work piece. In order to increase the hydraulic pressure after the rod has abutted against the work piece, it is necessary to detect the abutment of the rod against the work piece. A nozzle that ejects pressurized air is provided at the tip of the rod, connecting a hose or tube on the side of the rod near the upper end to supply the pressurized air, so that the rod tip's abutment against the work piece can be detected by, for example, a pressure sensor. When the nozzle abuts against the work piece the nozzle end is plugged by the work piece when the nozzle abuts against the work piece and the air pressure increases.

However, since the tip of the rod abuts against the work piece with a light force in order to prevent the rod tip abutment from causing any elastic deformation of the work piece, the weight of the hose or tube connected to the work support side may make it difficult for the rod to advance by the spring force. As a consequence, the position of the rod tip may vary, and in the worst case, it can so happen that the rod may not abut the work piece after locking even though the rod is locked after the rod's abutment against the work piece is confirmed according to the air pressure increase. The resistance can increase and the weight balance of the rod can deteriorate if the hose is surrounded by chips and debris from machining, so that the rod's advancing motion can become unstable.

The intention of the invention is to provide a work support that can cause the rod to abut the work piece in a reliable manner and detect the abutting condition by providing an air passage inside the work support to be connected to the nozzle in order to supply the pressurized air.

SUMMARY OF THE INVENTION

The work support of the present invention includes a rod that serves as an output member, a sleeve fitted on the outside of the rod and is elastically deformable to reduce its diameter, and a case for supporting the sleeve, and a detection means capable of detecting the abutment of the tip of the rod against the work piece which includes a detection nozzle provided at the tip of the rod for ejecting pressurized air and an air passage provided inside the rod to be connected with the detection nozzle for detecting the abutment by detecting the air pressure in the air passage.

In order to support a work piece, first connect the air passage to an outside air supply source so that pressurized air is supplied to the air passage, and the pressurized air is ejected from the detection nozzle at the tip of the rod. Next advance the rod and allow the tip of the rod to abut lightly against the work piece so that it does not cause any elastic deformation of the work piece. When the tip of the rod abuts the work piece, the ejection of the pressurized air from the detection nozzle will be prevented, thus causing a pressure increase of the air pressure in the air passage, so that the abutment of the tip of the rod against the work piece can be detected by the abutment detection means. After detecting the abutment condition, the sleeve is elastically deformed in such a way as to reduce the diameter to lock the rod.

Since the air passage used for supplying the pressurized air to the detection nozzle is provided inside the case and the rod, there is no need for connecting a pressurized air supply tube to the work support, so that the rod can be abutted in a more stable manner and the rod will never lock without the tip of the rod touching the work piece. Also, since it locks the rod only after detecting that the tip of the rod has abutted against the work piece, it is capable of locking the rod with the rod securely abutting with the work piece.

The work support according to the present invention includes a rod that serves as an output member, a spring that energies the rod in an advancing direction, a sleeve fitted in contact manner on the outside of the rod and being elastically deformable to reduce its diameter, a case for supporting the sleeve, an outer peripheral hydraulic chamber formed on the sleeve's periphery, a fluid pressure cylinder having a piston member and a pressure chamber for driving the piston member in the advancing direction and for driving the rod in the advancing direction via the piston member and the spring, a detection nozzle provided at the tip of the rod for ejecting pressurized air, an air passage provided inside the rod and the case to be connected with the detection nozzle, and an abutment detection means for detecting the abutment of the tip of the rod against the work piece by detecting the air pressure in the air passage.

In order to support a work piece, first connect the air passage to an outside air supply source so that pressurized air is supplied to the air passage, and the pressurized air is ejected from the detection nozzle at the tip of the rod. Next, allow the working fluid to enter the pressure chamber of the fluid pressure cylinder to drive the piston member in the advance direction, the piston member to compress the spring and help the rod to advance so that the rod can advance with the relatively weak force of the spring. Thus, the tip of the rod abuts the work piece without causing any elastic deformation.

When the tip of the rod abuts the work piece, the ejection of the pressurized air from the detection nozzle is prevented, thus causing a pressure increase of the air in the air passage, so that the abutment of the tip of the rod against the work piece can be detected by the abutment detection means. When the abutting condition is detected, introduce high pressure hydraulic oil to the outer peripheral hydraulic chamber or supply a working fluid of a high pressure to the work support to increase the pressure of the already filled hydraulic oil, thus locking the rod by causing an elastic deformation of the sleeve in the direction of reducing the diameter by means of the outer peripheral hydraulic chamber.

Since the air passage used for supplying the pressurized air to the detection nozzle is provided inside the case and the rod, there is no need for connecting a pressurized air supply tube to the work support, so that the rod can be abutted in a more stable manner and the rod is never locked without the tip of the rod touching the work piece. Also, since the rod is locked only after detecting that the tip of the rod has abutted against the work piece, it is capable of locking the rod with the rod securely abutting with the work piece. Moreover, since the rod is energized by the spring with a relatively weak force, it does not cause any elastic deformation of the work piece when it abuts against the work piece.

The system can also be constituted in such a way that the sleeve is elastically deformed in the direction of reducing the diameter after detecting the abutment of the tip of the rod against the work piece by means of the abutment detection means while continually ejecting the pressurized air from said detection nozzle. In order to support a work piece, first connect the air passage to an outside air supply source so that pressurized air is supplied to the air passage, and the pressurized air is ejected from the detection nozzle at the tip of the rod. When the tip of the rod abuts the work piece as the rod advances, the ejection of the pressurized air from the detection nozzle will be prevented, thus causing a pressure increase of the air in the air passage, so that the abutment of the tip of the rod against the work piece can be detected by the abutment detection means. After detecting the abutment condition, the sleeve is elastically deformed in such a way as to reduce the diameter to lock the rod. In other words, the rod can be locked while the tip of the rod is securely abutting against the work piece.

The fluid cylinder can be a hydraulic oil cylinder that advances the piston member using hydraulic oil as the working fluid. The rod can be driven via the piston member and the spring by supplying hydraulic oil to the hydraulic cylinder.

The pressure chamber and the outer peripheral hydraulic chamber can be connected communicatively. As a relatively low pressure is applied to the pressure chamber, which is sufficient to advance the piston member but not so large as to cause any elastic deformation of the sleeve to cause diameter reduction, until the tip of the rod abuts against the work piece, it causes the piston member to advance but does not lock the rod. After detecting the abutment of the tip of the rod against the work piece, high pressure hydraulic oil is introduced to the pressure chamber, allowing the high hydraulic pressure to be applied to the outer peripheral hydraulic chamber, and the sleeve to deform elastically to reduce the diameter, hence locking the rod.

The hydraulic cylinder can be arranged to have a spring to energize the piston member member in the retracting direction. In order to release the work support, reduce the hydraulic pressure in the outer periphery hydraulic chamber to release the locking on the rod, and vent the hydraulic oil from the pressure chamber of the hydraulic cylinder to allow the piston member to retract with the help of the spring, thus causing the tip of the rod to move away from the work piece.

PREFERRED EMBODIMENT OF THE INVENTION

Figure 1:
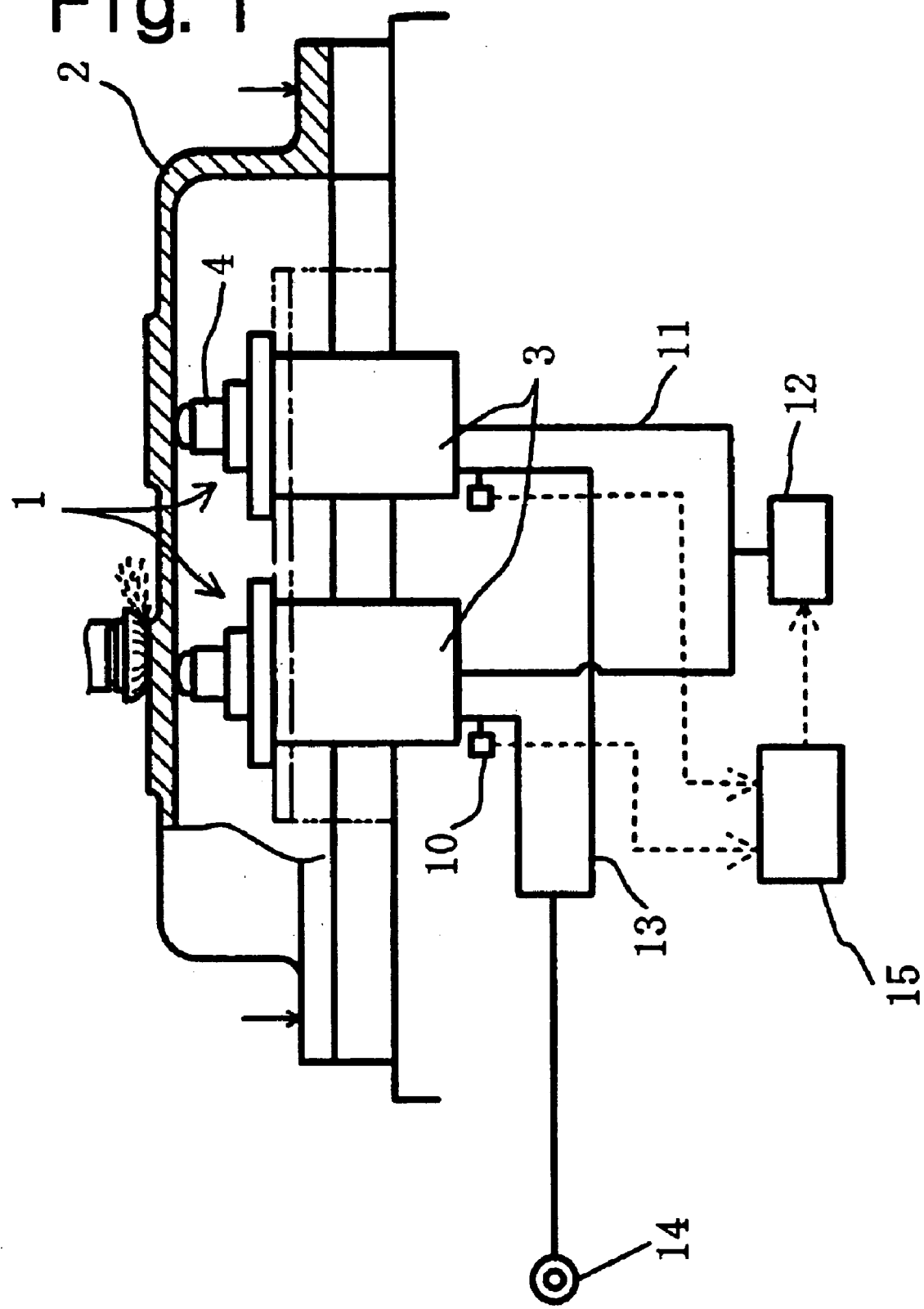
FIG. 1 is a diagram showing the constitution of a work support and its relating devices according to an embodiment of the present invention.
Figure 2:
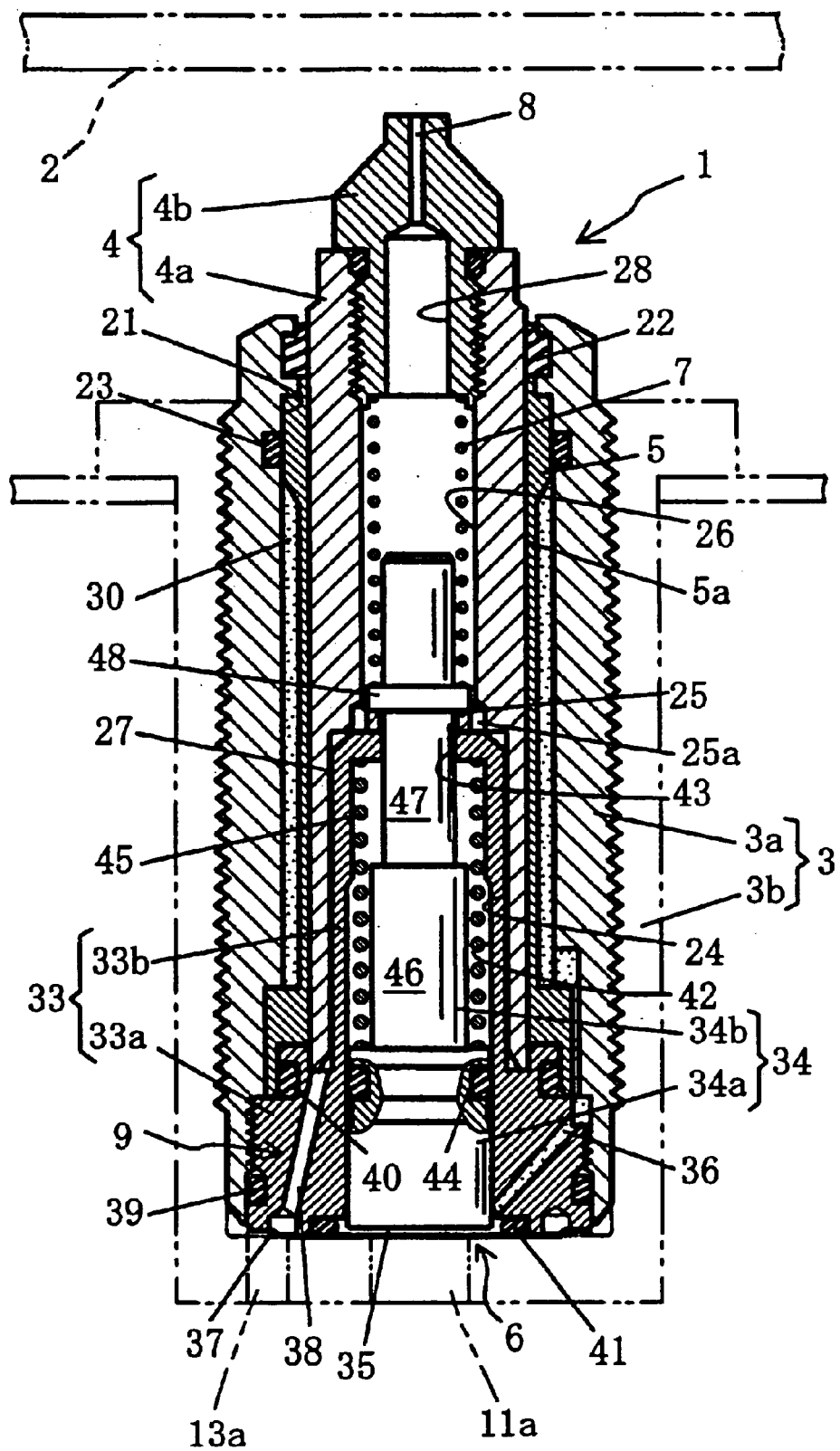
FIG. 2 is a vertical cross sectional view of the work support (when the rod is retracted)

A preferred embodiment of the present invention will be described below. As shown in FIG. 1, a work support 1 according to this embodiment supports a work piece 2 subjected to machining in the middle of its underside to prevent work piece 2 from elastic deformation and chattering. As shown in FIG. 1 and FIG. 2, work piece support 1 includes a case 3, a rod 4, which serves as the output member, a sleeve 5, which is fitted in contact manner on the outside of rod 4 and is elastically deformable, a hydraulic cylinder (fluid pressure cylinder) 6, which drives rod 4 in the advancing direction, a spring (compressive coil spring) 7, which elastically energizes rod 4 in the advancing direction, a detection nozzle 8, which ejects pressured air, an air passage 9, which is connected to said detection nozzle 8, an air passage 9, which is connected to the detection nozzle 8, a pressure sensor 10, which detects abutment of the tip of rod 4 against work piece 2 by detecting the pressure inside air passage 9, and a control unit 15 (pressure sensor 10 and control unit 15 constitute an abutment detection means) for controlling a hydraulic supply source 12 based on signals from the pressure sensor. Work support 1 is connected via an oil tube 11 to a hydraulic supply source 12 equipped with a hydraulic pump, a pump-driving electric motor, an accumulator, and others via an oil supply tube, and also to an air supply source 14 via an air supply tube 13.

In work support 1, rod 4 is advanced while pressurized air is ejected from detection nozzle 8 until the tip of rod 4 abuts against work piece 2, and rod 4 is locked by causing sleeve 5 to deform elastically in the direction to reduce its diameter after detecting the abutment of rod 4 by detecting the change of pressure of the pressured air by means of pressure sensor 10.

As shown in FIG. 2, substantially cylindrical case 3 supports rod 4 and sleeve 5, both of which are installed inside of it, and the case 3 consists of a case body 3a and a case cover 3b that fits on the outside of case body 3a. A sleeve mounting hole 21 is formed on the inner periphery of case body 3a, a scraper 22 is formed on the upper end of sleeve mounting hole 21 for scraping off extraneous matters on the outer periphery of rod 4 when rod 4 moves in and out, and a seal 23 is mounted on the upper end of sleeve mounting hole 21.

As shown in FIG. 2, rod 4 is installed inside of sleeve 5 in such a way as to be able to slide in and out, and rod 4 consists of a substantially cylindrical rod body 4a, an output portion 4b screwed on to the tip of rod body 4a, etc. A cylindrical hole 24 is formed on the lower half of rod body 4a, and a spring storing hole 26 having a smaller diameter than that of cylindrical hole 24 is formed also across an intermediate wall portion 25. A cylinder body 33b of hydraulic cylinder 6 is fitted in the inside of cylindrical hole 24, and rod 4 has a small gap 27 between it and cylinder body 33b, so that it can slide up and down guided between sleeve 5 and cylinder body 33b. Also, a plurality of communicating holes 25a is provided on intermediate wall 25 to connect gap 27 with spring storing hole 26 communicatively.

Output portion 4b is screwed on and fixed to the tip rod body 4a, and output portion 4b abuts against work piece 2 in supporting work piece 2. A cylindrical hole 28 is formed inside the bottom half of output portion 4b to communicate with spring storing hole 26, and detection nozzle 8 is provided communicating with the tip of this cylindrical hole 28 so that pressurized air can be ejected from the tip of rod 4.

As shown in FIG. 2, substantially cylindrical sleeve 5 is made of a metal and a thin wall cylindrical part 5a is formed for a substantial portion of this sleeve 5 in the longitudinal direction. Sleeve 5 is installed to fit the inside of sleeve mounting hole 21 of case body 3a, the upper part of sleeve body 5 is latched by the upper end of case body 3a from above, while the lower end of sleeve 5 is affixed sandwiched between case body 3a and cylinder body 33b of hydraulic cylinder 6. Thin wall cylindrical part 5a is elastically deformable in the direction of reducing the diameter, an outer peripheral hydraulic chamber 30 is formed on the outer peripheral side of thin wall cylindrical part 5a, and this outer peripheral side hydraulic chamber 30 communicates with an oil chamber 35 of hydraulic cylinder 6 in order to provide hydraulic pressure to oil chamber 35.

As shown in FIG. 2, hydraulic cylinder 6 is equipped with a cylinder member 33, a piston member 34 and oil chamber (pressure chamber) 35, and this hydraulic cylinder 6 drives rod 4 in the advancing direction via piston member 34 and spring 7. Cylinder 33 is made by forming integrally a cylinder base 33a, which is internally screwed on to the bottom part of case body 3a, and a cylinder body 33b that extends upward from cylinder base 33a. An oil passage 36 for supplying hydraulic oil to outer peripheral hydraulic chamber 30, an air supply port 37 of air passage 9, and a communication passage 38 are formed in cylinder base 33a, and oil passage 36 connects oil chamber 35 and outer peripheral hydraulic chamber 30 communicatively. Seals 39 and 40 are provided between cylinder member 33 and case body 3a, and a seal 41 is provided between seal 33 and case cover 3b. A cylinder hole 42 is provided inside cylinder body 33b, and an opening 43 is provided on the upper wall portion of cylinder hole 42.

Piston member 34 is made by forming a piston 34a and a piston rod 34b that extends upward from piston 34a integrally. Piston 34a is installed to be able to slide freely in cylinder hole 42, a seal 44 is installed on piston 34a, oil chamber 35 is formed below piston 34a, and hydraulic oil is supplied to said oil chamber 35 from hydraulic supply source 12 via hydraulic pressure supply/discharge port 11a. In order to abut rod 4 against the work piece, apply a relatively low hydraulic pressure, which does not cause any elastic deformation of sleeve 5 in the diameter reduction direction, to oil chamber 35 in order to advance piston member 34, apply a higher hydraulic pressure to oil chamber 35 in order to lock rod 4 after rod 4 has abutted against work piece 2, and supply a high hydraulic pressure to outer peripheral oil chamber 30 via oil passage 36 in order to lock rod 4 by causing thin wall cylindrical part 5a to cause an elastic deformation in the direction of reducing the diameter. A spring 45 is provided above piston 34a for energizing piston member 34 in the retracting direction.

Piston rod 34b consists of a large diameter portion 46 and a small diameter portion 47, wherein small diameter portion 47 extends toward spring storing hole 26 through the center holes of opening 43 and intermediate wall 25, the middle step portion of small diameter portion 47 located in spring storing hole 26 has a flanged latching portion 48, and flanged latching portion 48 latches with intermediate wall 25 to push down rod 4 as piston member 34 retracts downward.

The bottom end of spring 7 that energizes rod 4 in the advancing direction is latched by flanged latching portion 48 of piston rod 34b, and the bottom half of spring 7 is installed on the outside of small diameter portion 46 of piston rod 34b and spring 7 is displaced in spring storing hole 26. Spring 7 energizes rod 4 with a weak force in the advancing direction so that the tip of rod 4 does not cause any deformation of work piece 2 when rod 4 abuts work piece 2.

Now the description of detection nozzle 8, air passage 9, pressure sensor 10, and control unit 15. As described before, detection nozzle 8 is provided at the tip of rod 4, and pressurized air is provided to this detection nozzle 8 via air passage 9, so that the ejection of the pressurized air will be prevented by work piece 2 when rod 4 abuts against work piece 2.

Air passage 9 is formed in the insides of case 3 and rod 4 and connects with detection nozzle 8, and this air passage 9 includes air supply port 37 of cylinder base 33a, communication passage 38, gap 27 between rod 4 and cylinder body 33, spring storing hole 26, cylindrical hole 28 formed in rod 4, etc., wherein the pressurized air is supplied from air supply source 14 via air supply port 13a connected to air supply port 37, and the pressurized air is supplied to detection nozzle 8 via communicating passage 38, gap 27, spring storing hole 26, and cylindrical hole 28.

Pressure sensor 10 is provided in the vicinity of air supply port 37 of air supply tube 13, and pressure sensor 10 detects the pressure in air passage 9. Control unit 15 is for controlling hydraulic supply source 12 based on the signal of pressure increase in air passage 9 received from pressure sensor 10, and consists of a display for displaying the abutment condition of rod 4, an operation panel for switching between the low pressure and the high pressure, a driving circuit for driving a switching valve for switching the hydraulic pressure.

In supporting work piece 2, when the tip of rod 4 abuts against work piece 2 while pressurized air is being supplied via air passage 9 to detection nozzle 8 and is being ejected from detection nozzle 8, work piece 2 prevents the ejection of the pressurized air from detection nozzle 8, the pressure in air passage 9 increases, pressure sensor 10 detects the pressure increase in air passage 9, which signals the abutment of rod 4 and work piece 2, this abutment status is displayed on control unit 15, and control unit 15 controls hydraulic supply source 12 to supply the higher hydraulic pressure to oil chamber 35.

Next, the operation of work support 1 will be described below.

As shown in FIG. 1 and FIG. 2, work support 1 and hydraulic supply source 12 are connected via oil tube 11, work support 1 and air supply source 14 are connected via air supply tube 13, and the pressurized air is supplied to detection nozzle 8 via air passage 9 so that the pressurized air can be ejected through detection nozzle 8.

Figure 3:
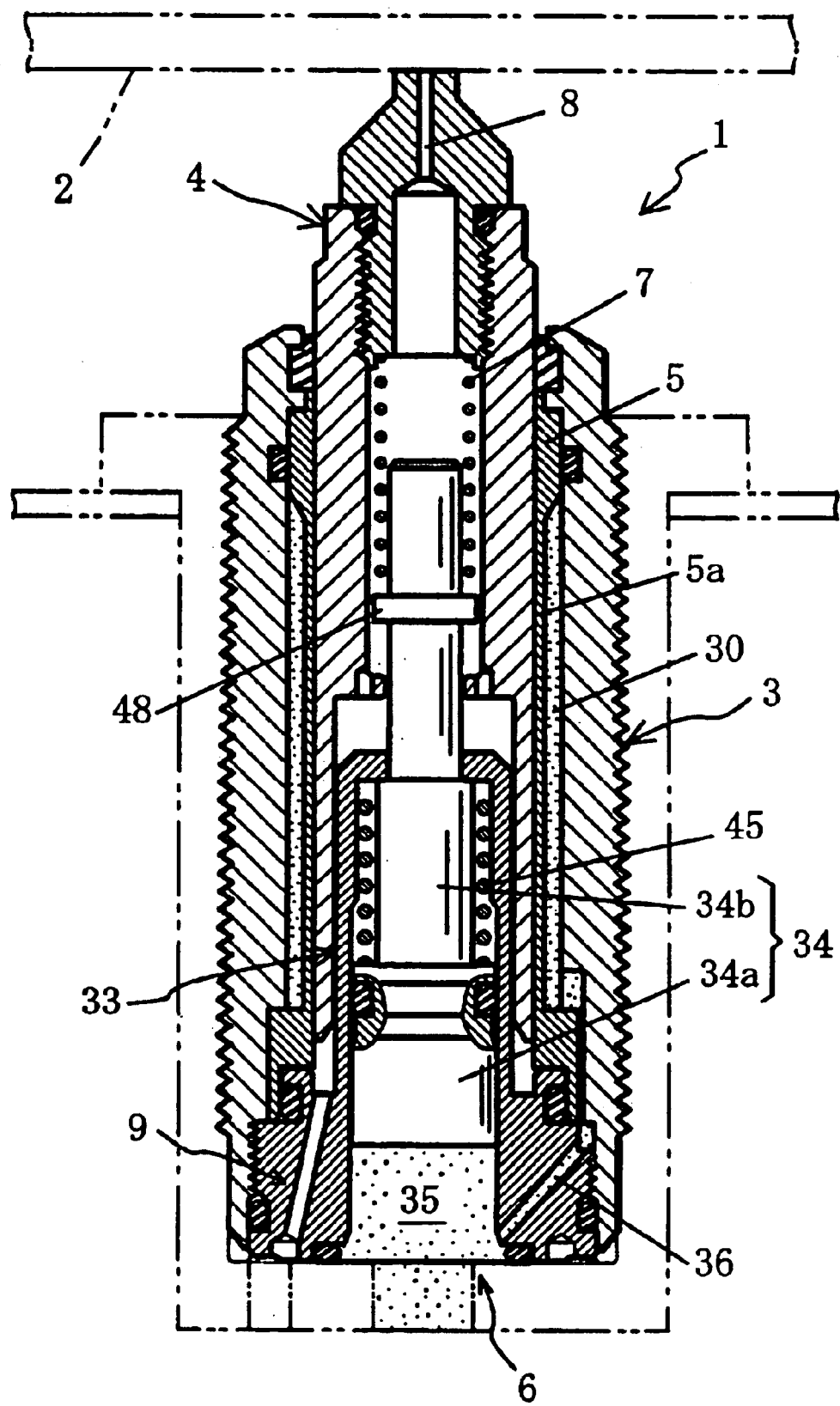
FIG. 3 is a vertical cross sectional view of the work support (when the rod is supporting a work piece).

When relatively low pressure hydraulic oil is supplied to oil chamber 35 under this condition, piston 34a is driven in the advancing direction against the energizing force of spring 45 as shown in FIG. 3, thus causing piston rod 34b to advance, and flange engagement portion 48 is released from intermediate wall 25 to allow rod 4 to advance. Consequently, rod 4 advances upward, being energized by spring 7. At this time, outer peripheral hydraulic chamber 30 connected to oil chamber 35 also receives the low hydraulic pressure, but that hydraulic pressure is insufficient to cause any elastic deformation of thin wall cylindrical part 5a of sleeve 5 to reduce its diameter, so that rod 4 does not get locked and advances upward.

When rod 4 advances and the tip of rod 4 abuts against work piece 2, the ejection of pressurized air from detection nozzle 8 will be prevented by work piece 2, so that the pressure in air passage 9 will increase and the pressure increase will be detected by pressure sensor 10. This pressure increase signal will be transmitted to control unit 15, and the abutment of the tip of rod 4 and work piece 2 will be detected by pressure sensor 10. After the abutment of rod 4 and work piece 2 is detected, control 15 controls hydraulic pressure source 12 to supply a high pressure oil to oil chamber 35. This high hydraulic pressure is also supplied to outer peripheral oil chamber 30, and causes an elastic deformation of thin cylindrical part 5a of sleeve 5 to reduce its diameter, thus generating a static friction force between it and rod 4, locking rod 4 to prevent its vertical motion.

According to work support 1 thus constituted, having air passage 9 for supplying pressurized air to detection nozzle 8 provided in the inside of work support 1, provides a better weight balance for rod 4, so that the position of rod 4 when rod 4 advances and abuts with work piece 2 is more stable. Also, since rod 4 can be locked after detecting the abutment status of the tip of rod 4 and work piece 2 by detecting the pressure of air passage 9 with pressure sensor 10, rod 4 can be locked when it is abutted against work piece 2 in a more stable manner.

Since it is so configured that a low hydraulic pressure is supplied to oil chamber 35 in advancing rod 4, and a high hydraulic pressure is supplied to oil chamber 35 for locking rod 4 only after the abutment of rod 4 against work piece 2 is detected, there is no way that rod 4 can get locked when it is not abutting work piece 2.

Since rod 4 is driven by a weak energizing force by means of spring 7, no elastic deformation of work piece 2 occurs when the tip of rod 4 abuts against work piece 2.

Followings are other embodiments, which are achieved by partially modifying the aforementioned embodiment:

1) It is possible to not to communicate oil chamber 35 of hydraulic cylinder 6 with outer peripheral hydraulic chamber 30 and supply hydraulic oil using separate oil tubes 11 independently.
2) Piston member 34 can be driven to advance by an air cylinder In this case, outer peripheral hydraulic chamber 30 can be connected with oil tube 11 to receive the hydraulic pressure, or fill outer peripheral hydraulic chamber 30 with pressurized oil and then increase this hydraulic pressure using the pressurized air.
3) It is also possible to use a pressure switch that turns ON when the pressure increases instead of pressure sensor 10.
4) It is possible to form the outer periphery of sleeve 5 in a tapered shape, cause a cylindrical piston member having a tapered inner surface that can engage with the outer periphery of sleeve 5 and a piston part to fit on the outer periphery of sleeve 5, and cause the piston to retract by means of a hydraulic force or a spring force to cause the outer periphery of sleeve engage with the inner periphery of the piston member, thus causing sleeve 5 to deform elastically in the diameter reducing direction. It is also possible to insert a plurality of steel balls between the inner periphery of sleeve 5 and the outer periphery of the piston member in order to reduce the friction force.

What is claimed is:

1. A work support comprising;
a rod which functions as an output member,
a sleeve fitted in contact manner on the outside of the rod and being elastically deformable to reduce diameter, and
a case that supports said sleeve;
a detection nozzle provided at a tip of said rod for ejecting pressurized air;
an air passage formed inside of said case and said rod and connected to said detection nozzle; and
an abutment detection means capable of detecting abutment between the tip of said rod and the work piece using said pressurized air in said air passage.

2. A work support described in claim 1 wherein said rod is advanced while ejecting pressurized air from said detection nozzle, and said sleeve is driven to deform elastically to reduce its diameter after detecting the abutment of the tip of the rod against the work piece.

3. A work support comprising;
a rod which functions as an output member;
a spring energizing said rod in an advancing direction;
a sleeve, fitted in contact manner on the outside of the rod and being elastically deformable to reduce said diameter,
a case that supports said sleeve;
an outer peripheral hydraulic chamber formed on the outside periphery of the sleeve:
a fluid pressure cylinder comprising; a piston member and a pressure chamber for driving said piston member in said advancing direction, and drives said rod in said advancing direction via the piston member and said spring;
a detection nozzle provided at a tip of said rod for ejecting pressurized air;
an air passage formed inside of said case and said rod and connected to said detection nozzle; and
an abutment detection means capable of detecting abutment between the tip of said rod and the work piece using said pressurized air in said air passage.

4. A work support described in claim 3 wherein said fluid pressure cylinder is an oil hydraulic cylinder that uses oil hydraulic pressure to advance said piston member.

5. A work support described in claim 4 wherein said pressure chamber and said outer peripheral hydraulic chamber communicate with each other.

6. A work support described in claim 5, wherein said fluid pressure cylinder includes a spring for elastically energizing said piston member in a retracting direction.

7. A work support described in claim 4, wherein said fluid pressure cylinder includes a spring for elastically energizing said piston member in a retracting direction.

8. A work support described in claim 2, wherein said fluid pressure cylinder includes a spring for elastically energizing said piston member in a retracting direction.

9. A work support described in claim 3 wherein said rod is advanced while ejecting pressurized air from said detection nozzle, and said sleeve is driven to deform elastically to reduce its diameter after detecting the abutment of the tip of the rod against the work piece.

* * * * *